United States Patent
Furrer

[15] 3,672,399
[45] June 27, 1972

[54] HYDRAULIC OR PNEUMATIC CONTROLLED TWO STAGE SLIDE VALVE

[72] Inventor: Eduard Furrer, Zurich, Switzerland
[73] Assignee: Contraves AG, Zurich, Switzerland
[22] Filed: Jan. 7, 1971
[21] Appl. No.: 104,555

[52] U.S. Cl.................137/625.62, 137/625.63, 137/625.68
[51] Int. Cl.........................................................F16k 11/07
[58] Field of Search...................137/625.62, 625.63, 625.6, 137/625.68, 625.69

[56] References Cited

UNITED STATES PATENTS

| | | | |
|---|---|---|---|
| 3,283,667 | 11/1966 | Andersen | 137/625.6 |
| 3,025,867 | 3/1962 | Lucien | 137/625.62 |
| 3,530,894 | 9/1970 | Henzgen | 137/625.6 |
| 3,234,968 | 2/1966 | Frantz | 137/625.63 |
| 3,486,801 | 12/1969 | Frayer | 137/625.63 |

*Primary Examiner*—Alan Cohan
*Assistant Examiner*—William H. Wright
*Attorney*—Werner W. Kleeman

[57] ABSTRACT

A fluid-operated, in particular hydraulically or pneumatically controllable, two-stage slide valve arrangement including an outlet stage arrangement for alternately communicating in flow relationship an outflow conduit with a pressure conduit and return flow conduit of a fluid-operated system is described and comprises a sleeve valve member having opposed end faces and respective coaxially extending displacement piston member acting upon each end face of said sleeve valve member, with the effective cross-sectional area of both said displacement piston members differing from one another, the outlet stage arrangement alternately connecting said outflow conduit with said pressure conduit and said return flow conduit when the displacement piston member with the smaller effective cross-sectional area is continuously impinged by a predetermined pressure of a fluid medium delivered by said pressure conduit. A forwardly arranged control stage arrangement alternately couples the other displacement piston member with the larger effective cross-sectional area to the pressure conduit and the return flow conduit, said control stage arrangement including a first diaphragm means for coupling the displacement piston member of larger effective cross-sectional area of the outlet stage arrangement with the pressure conduit, and a second diaphragm means for coupling such displacement piston member of larger cross-sectional area with the return flow conduit. Both diaphragm means have an opening and at least one valve means serves for alternately closing and opening at least one opening of one of said diaphragm means, the valve means includes at least one to-and-fro movable valve body member cooperating with said one diaphragm means and a valve membrane for moving said valve body member. There is also means for selectively operating the valve membrane and thus said valve body member for closing and opening at least said one opening of said one diaphragm means.

4 Claims, 2 Drawing Figures

INVENTOR
EDUARD FURRER
BY WERNER W. KLEEMAN
ATTORNEY

HYDRAULIC OR PNEUMATIC CONTROLLED TWO STAGE SLIDE VALVE

BACKGROUND OF THE INVENTION

The present invention relates to a new and improved fluid-operated, especially hydraulically or pneumatically controllable two-stage slide valve arrangement for alternately operatively communicate in flow relationship an outflow conduit with a pressure conduit and return flow conduit of a fluid-operated system when a respective coaxially extending displacement piston member acts upon each end face of a sleeve valve or slide valve piston member, the effective cross-sectional areas of such displacement piston members differing from one another. In the system of the invention the displacement piston member with the smaller effective cross-sectional area is continuously impinged with a predetermined pressure of the fluid medium delivered by the pressure conduit, and a forwardly connected control stage alternately connects the other displacement piston member having the larger effective cross-sectional area with the pressure conduit and the return flow conduit.

In known two-stage slide valve arrangements there are used both in the output or outflow stage arrangement as well as in the pre-stage arrangement slide valves or slide valve piston members for alternately connecting and disconnecting conduits. Such slide valve arrangements manifest themselves by virtue of their very short switching times, typically several milliseconds. These short switching times are especially attained by virtue of the fact that displacement of the slide valves within their receiving bores is not impeded by any sealing elements. Any time-delay which might arise owing to contamination or soiling of the system or the hydraulic "adhesion" effect at the sleeve valve or slide valve piston member of the outlet stage is negligible since, by virtue of the high operating pressures, large forces act upon this slide valve. However, in the preliminary or pre-stage arrangement there are oftentimes available only very small control pressures for the to-and-fro movement of the sleeve valve, so that during longer interruptions in the switching operation it is indeed possible for delays in the switching process to occur, which delays are brought about by the hydraulic adhesion effect prevailing at the sleeve valve of the pre-stage arrangement.

SUMMARY OF THE INVENTION

Accordingly, there is still present in the art a need for an improved fluid-operated, especially hydraulically or pneumatically controllable two-stage slide valve arrangement, which is not associated with the aforementioned drawbacks of the prior art systems. Therefore, a primary objective of the instant invention is the provision of a slide valve arrangement of the mentioned type which effectively and reliably overcomes the previously discussed drawbacks of the prior art equipment and fulfills the existing need in the art.

Another and more specific object of the present invention relates to the provision of a novel type of hydraulically or pneumatically controlled two-stage slide valve arrangement possessing extremely short switching times.

Yet further significant object of the present invention relates to an improved fluid-operated slide valve arrangement which not only manifests itself through short switching times, especially at the pre-stage arrangement thereof, but one which is also relatively simple in construction, economical to manufacture, not readily subject to breakdown, extremely reliable in operation, and requiring a minimum of maintenance and servicing.

Now in order to implement these and still further objects of the invention, which shall become more readily apparent as the description proceeds, the inventive fluid-operated slide valve arrangement is manifested by the features that the displacement piston member possessing the larger effective cross-sectional area of the outlet or output stage is coupled by a first diaphragm means with the pressure conduit or line and by a second diaphragm means with the return flow line, that at least the opening of one diaphragm means is alternately closed and opened by at least one valve unit, that the to-and-fro movement of at least one valve closing member of the valve unit is alternately subjected to an underpressure or overpressure through the action of at least one valve membrane owing to the action of fluid-operated, e.g., pneumatic or hydraulic control means which bound a respective hollow compartment at the respective outer faces or side of said at least one valve membrane, in order to close and open at least the opening of said one diaphragm means.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
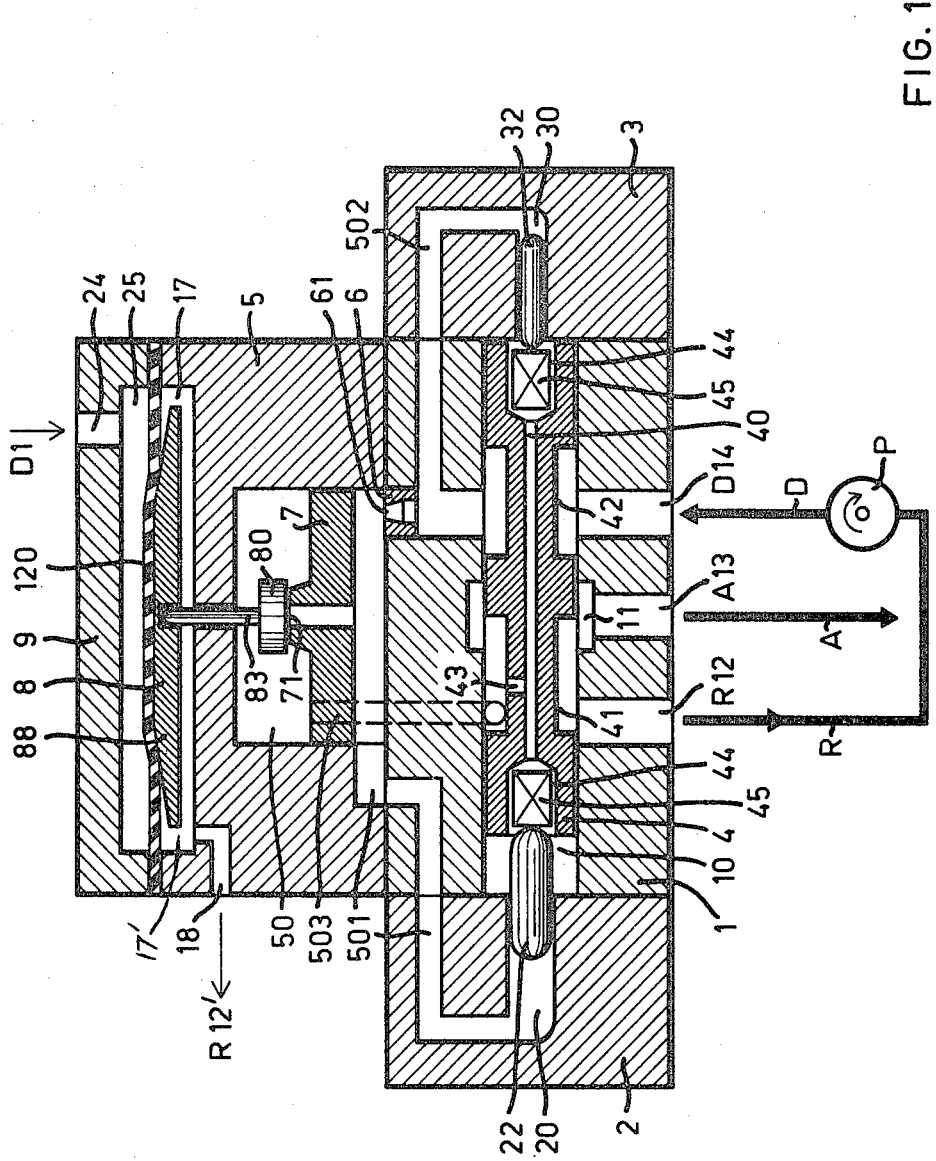
FIG. 1 is a longitudinal sectional view of a two-stage slide valve arrangement of the present invention incorporating a closing mechanism for one of the diaphragms or orifice plates.

Describing now the drawings, in the exemplary embodiment of inventive slide valve arrangement depicted in FIG. 1 there is provided a housing unit 1 containing a longitudinally extending bore 10 for slidably receiving sleeve valve or slide valve piston member 4. Additionally this housing unit 1 is provided with the annular groove means 11, the pressure conduits or lines 501 and 502, the return flow conduit or line 503 communicating with the bore 10, as well as the return flow conduit or connection R12, the outlet or outflow connection A13 and the pressure conduit or connection D14 which is also coupled with the pressure conduit 502. A first diaphragm or orifice plate 6 is installed in the pressure line 502, as shown.

Additionally it will be observed that at each side of the housing or housing unit 1 there is provided a cover member 2 and 3, respectively, equipped with the bores 20 and 30 respectively, and portions of the conduits or lines 501 and 502 respectively, the cover members 2 and 3 being sealingly mounted at the ends of the housing 1. The bores 20 and 30 possess a cross-sectional area which differs from one another and serve as guide means for the displacement piston members 22 and 32 respectively, which likewise possess different effective cross-sectional areas from one another and smaller than that of the sleeve valve 4. Displacement piston members 22 and 32 act upon the end faces or surfaces of the sleeve valve or slide valve piston member 4.

The slide valve piston member 4 additionally is equipped with two annular grooves 41 and 42 and an axial extending bore 40 which widens at both ends 44, as shown. A transversely extending opening or aperture 43 communicates the axially extending bore 40 with the annular groove 41. At the widened end portions 44 of the bore 40 there is inserted a respective square member 45, or equivalent structure, against which act the associated displacement piston member 22 or 32 respectively. Since the square member 45 does not completely fill out the associated hollow cylindrical widened portion 44 there continuously prevails a connection between the left and/or right portions of the bore 10 located externally of the slide valve piston member 4 and the return flow conduit or connection R12, so that any leakage fluid medium flowing-out at the location of the displacement piston members 22 and 32, or else at some other location of the pressurized system, does not impair the to-and-fro movement of the slide valve piston member 4, rather can flow back to the return flow conduit R12.

A socket member 5 of the housing unit 1 contains the conduit 501, the conduit 18 leading to a separate return flow conduit R12', the widened portions or chamber recesses 17 and 50, a guide bore or aperture for the valve rod 83, the second diaphragm or orifice plate 7 having the diaphragm opening 71, and the return flow conduit 503.

The cover or cover portion 9 of the socket 5 is equipped with the connection or port 24 and the widened portion or chamber recess 17. A valve diaphragm or membrane 120 of a valve unit 8 divides the chamber 17 into hollow compartments 17' and 25. The rod member 83 which is rigidly connected with a valve closure body 80 is displaceably guided in the socket 5 and at the valve plate 88 rigidly connected with the valve diaphragm 120, so that there is ensured for a clean closing action of the diaphragm opening 71. The output stage of the slide valve arrangement can be actuated by a hydraulic or pneumatic system, here shown as consisting of a pump P equipped with the pressurized conduit or line D and the return flow conduit or line R.

With the aid of the likewise hydraulically or pneumatically actuated pre-stage it is possible to couple the displacement piston member 22 possessing the larger effective cross-sectional area either only with the pressurized conduit D via a small opening 61 of the diaphragm 6 or also, however, via a larger opening 71 of the diaphragm 7 with the return flow line or conduit R. The displacement piston member 32, just as is the case with the pressure conduit D14, always remains coupled with the pressure line or conduit D. In the illustrated position the valve membrane or diaphragm 120 is deformed via the connection 24 with the aid of a pneumatic or hydraulic fluid medium, indicated at D1, in such a manner that the valve closure body 80 keeps the valve or diaphragm opening 71 closed. Consequently, the pressure of the fluid medium in the pressure connection or conduit D14 acts upon the displacement piston member 22 and maintains the slide valve piston member 4 in the illustrated position. The connection A13 is coupled via the annular groove 41 with the return flow connection R12.

If the hollow compartment 25 or the valve diaphragm 120 is relieved of the pressure action schematically indicated at D1, then the diaphragm opening 71 is released by the valve closure body 80 so lower pressure conditions can prevail at the displacement piston member 22. Now the displacement piston member 32 displaces the slide valve piston member or sleeve valve 4 until it contacts against the cover member 2 at the left side of the system shown in FIG. 1. Hence, the outlet connection A13 is coupled in flow communication with the pressure connection D14 via the annular groove 42, and is cut off or separated from the return flow conduit R12. The leakage fluid medium flowing through the small diaphragm opening 61 of the diaphragm or orifice plate 6 is delivered via the larger diaphragm opening 71 to the conduit 503, and therefore delivered back to the return flow arrangement R12, R. The channel 18 connects the hollow compartment 17' with a separate return flow line, schematically indicated at R12', which also renders possible a disturbance-free functioning of the valve diaphragm 120 even if leakage fluid medium penetrates into such hollow compartment.

Figure 2:
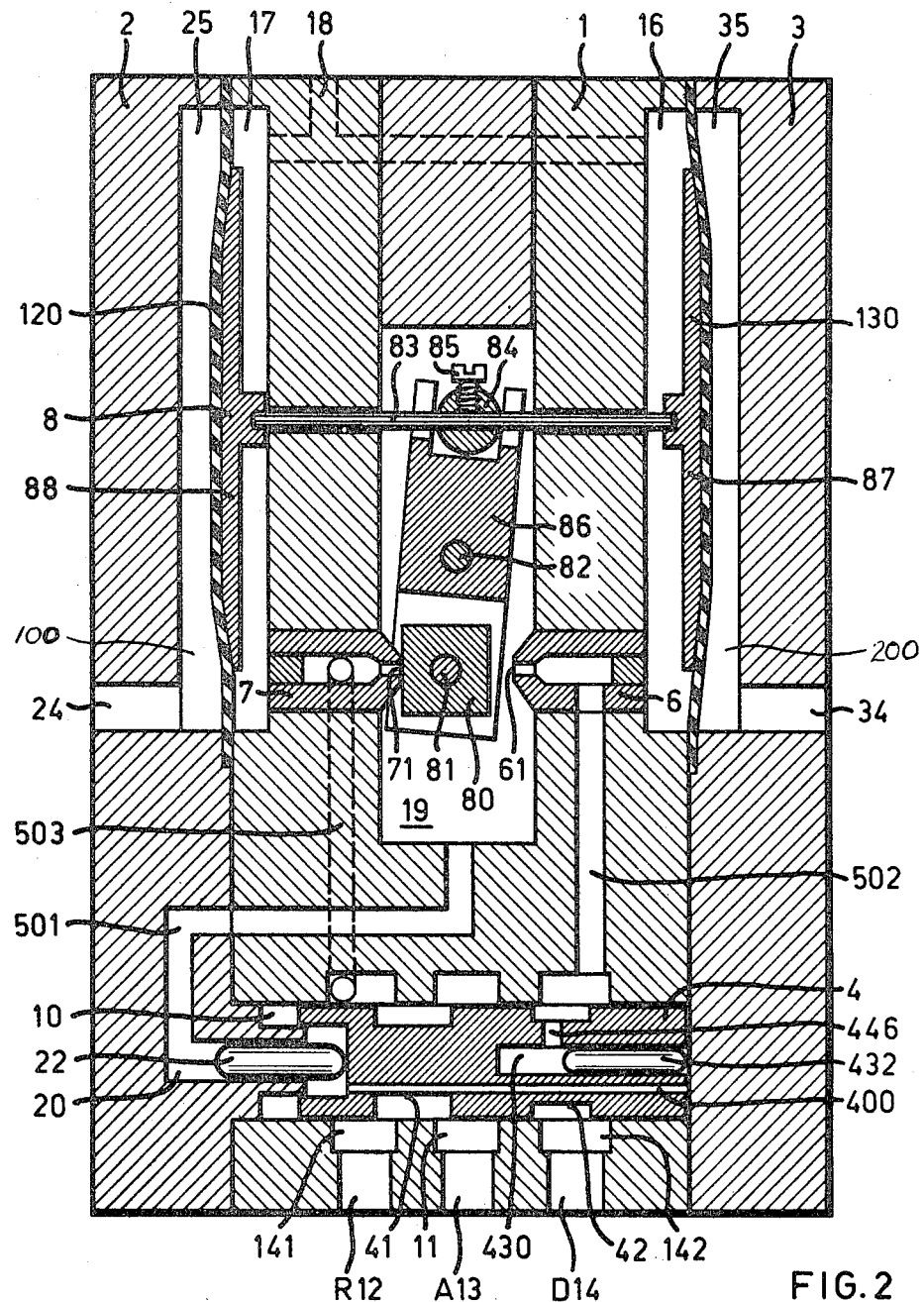
FIG. 2 is a modified form of inventive two-stage slide valve arrangement, again in longitudinal sectional view, illustrating a closing mechanism for both diaphragms or orifice plates.

Considering now the modified version of slide valve arrangement as depicted in FIG. 2, there it will be recognized that at the first or pre-stage thereof a respective valve diaphragm or membrane 120 and 130 separates the chambers 100 and 200 into the hollow compartments 17, 25 and 16, 35 respectively. By means of the inflow ports or connections 34 and 24, it is possible to deform the diaphragms 120 and 130, respectively, through the action of a pneumatic or hydraulic fluid medium in such a manner that the valve closure body member 80 carries out reciprocating or to-and-fro movements. These movements of the valve diaphragms 120 and 130 are transmitted by means of the rod 83, the shaft 84 secured by screws 85 to such rod, the connection piece 86 rotatably mounted at a pin or shaft member 82 and provided at both sides with slots, and via a further shaft 81 secured to the connection piece 86, to the valve closure body member 80. Due to these to-and-fro movements the diaphragm openings 61 and 71 of the diaphragm 6 and 7, respectively, are alternately closed and opened. The bore 10 in the exemplary embodiment of slide valve arrangement under consideration, is enlarged by the annular grooves 11, 141 and 142. The displacement piston member 432 is slidably arranged at a non-continuous or one-end closed axial bore 430 of the slide valve member 4, this displacement piston member 432 being continuously connected with the pressure conduit or connection D14 through the agency of the annular grooves 42 and 142 as well as the opening or aperture 446.

In the illustrated position of the valve closure body member 80, the pressure of the fluid medium moving through connection D14 acts via the channel 502, the diaphragm opening 61 and the channel 501 upon the displacement piston member 22 possessing the larger effective cross-sectional area. The sleeve valve or slide valve piston member 4 is thus maintained in the illustrated position. The outlet connection A13 is coupled via the annular grooves 11, 41 and 141 with the return flow conduit R12. If the diaphragm 130 is pneumatically or hydraulically subjected to pressure via port 34, then, the diaphragm opening 61 is closed by the valve closure body 80 and the diaphragm opening 71 is opened. The channel 501 is cut off or separated from the channel 502 and by means of the chamber recess or widened portion 19, the diaphragm opening 71, the channel 503 and the annular grooves 41 and 141 this channel 501 is connected with the return flow line R120. The relieved displacement piston member 22 is pushed back by the slide valve piston member 4 until contacting the stop at the left of the bore 20, this slide valve piston member 4 being moved by the forces generated in the axial bore 430 by virtue of the pressure. The outlet connection A13 is thus separated from the return flow connection R12 and coupled via the annular grooves 11, 42 and 142 with the pressure conduit or connection D14. Any escaping pneumatic or hydraulic leakage fluid medium which has collected at the bore 10, to the left and/or right of the slide valve piston member 4, is returned via the longitudinal bore 400 in such slide valve piston member 4 back to the return flow conduit R12. The slide valve arrangement always remains functional. The channel 18 connects both hollow compartments 16 and 17 with one another and to the outside, and therefore renders possible also during escape of any leakage fluid medium, a disturbance-free functioning of the membranes or diaphragms 120 and 130 in the hollow compartments 16 and 17.

While there is shown and described present preferred embodiments of the invention, it is to be distinctly understood that the invention is not limited thereto but may be otherwise variously embodied and practiced within the scope of the following claims.

Accordingly, what is claimed is:

1. A fluid-operated, in particular hydraulically or pneumatically controllable, two-stage slide valve arrangement including an outlet stage arrangement for alternately communicating in flow relationship an outflow conduit with a pressure conduit and return flow conduit of a fluid-operated system, comprising said outlet stage arrangement embodying a slide valve housing provided with an outflow conduit, a pressure conduit, and a return flow conduit, a sleeve valve member having opposed end faces, a respective coaxially extending displacement piston member acting upon each end face of said sleeve valve member, the effective cross-sectional area of both said displacement piston members differing from one another, said outlet stage arrangement alternately connecting said outflow conduit with said pressure conduit and said return flow conduit when the displacement piston member with the smaller effective cross-sectional area is continuously impinged by a predetermined pressure of a fluid medium delivered by said pressure conduit, and a forwardly arranged control stage arrangement for alternately coupling the other displacement piston member with the larger effective cross-sectional area to said pressure conduit and said return flow conduit, said control stage arrangement including a first diaphragm means for coupling the displacement piston member of larger effective cross-sectional area of the outlet stage arrangement with the pressure conduit, and a second diaphragm means for coupling such displacement piston member of larger cross-sectional area with the return flow conduit, both said diaphragm means each having an opening, at least one valve means for alternately closing and opening at least one opening of one of said diaphragm means, said valve means including at least one to-and-fro movable valve body member cooperating with said one diaphragm means and a valve membrane for moving said valve body member, means for selectively operating said valve membrane and thus said valve body member for closing and opening at least said one opening of said one diaphragm means.

2. A fluid-operated, in particular hydraulically or pneumatically controllable two-stage valve arrangement as defined in claim 1, wherein the cross-sectional area of the opening of said first diaphragm means is smaller than the cross-sectional area of the opening of said second diaphragm means, said valve closure body member opening and closing the opening of said second diaphragm means.

3. A fluid-operated, in particular hydraulically or pneumatically controllable slide valve arrangement as defined in claim 1, wherein two diaphragm means and a valve means with two valve membranes are provided and arranged in such a manner that alternately said valve membranes under the action of said operating means move said valve closure body member to-and-fro for selectively closing and opening said respective openings of said two diaphragm means.

4. A fluid-operated two-stage slide valve arrangement comprising an outlet stage arrangement embodying a slide valve housing provided with an outflow conduit, a pressure conduit, and a return flow conduit, a sleeve valve member having opposed end faces, a respective coaxially extending displacement piston member acting upon each end face of said sleeve valve member, the effective cross-sectional area of both said displacement piston members differing from one another, said outlet stage arrangement alternately connecting said outflow conduit with said pressure conduit and said return flow conduit when the displacement piston member with the smaller effective cross-sectional area is continuously impinged by a predetermined pressure of a fluid medium delivered by said pressure conduit, a control stage arrangement for alternately coupling the other displacement piston member with the larger effective cross-sectional area to said pressure conduit and said return flow conduit, said control stage arrangement embodying a first means for coupling the outflow stage arrangement by means of the displacement piston member of larger effective cross-sectional area with the pressure conduit, and a second means for coupling the outflow stage arrangement by means of the displacement piston member with the larger cross-sectional area with the return flow conduit, said first and second coupling means each having an opening, at least one valve means for alternately closing and opening at least one opening of one of said coupling means.

* * * * *

UNITED STATES PATENT OFFICE
CERTIFICATE OF CORRECTION

Patent No. 3,672,399      Dated June 27, 1972

Inventor(s) EDUARD FURRER

It is certified that error appears in the above-identified patent and that said Letters Patent are hereby corrected as shown below:

Cancel the illustrative figure of drawing on the cover sheet and substitute the attached figure of drawing.

Signed and sealed this 16th day of July 1974.

(SEAL)
Attest:

McCOY M. GIBSON, JR.
Attesting Officer

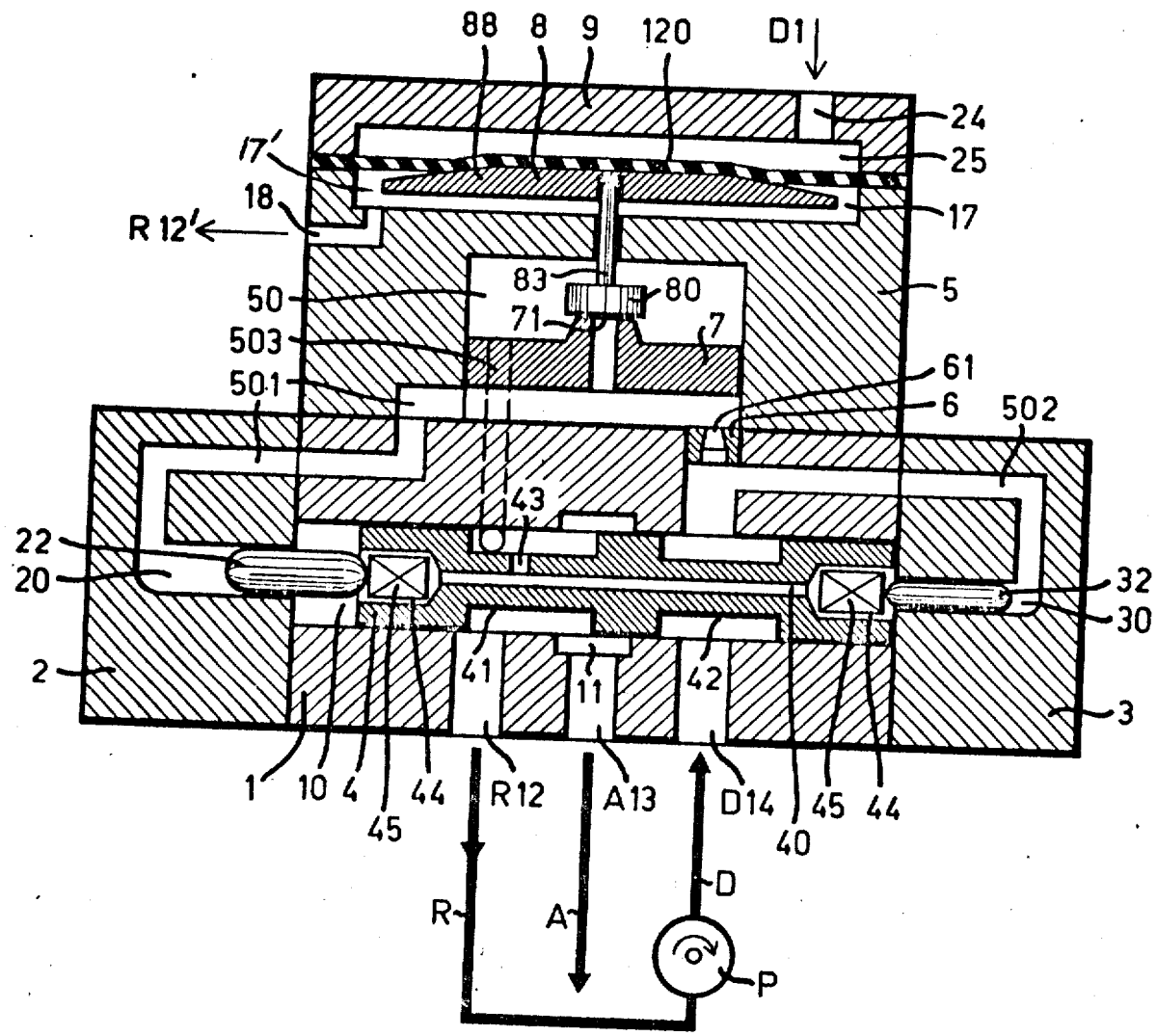

C. MARSHALL DANN
Commissioner of Patents